(12) United States Patent
Hurford

(10) Patent No.: US 6,216,902 B1
(45) Date of Patent: Apr. 17, 2001

(54) FUEL CAP CONTOURED COVER

(76) Inventor: John Hurford, 4716 Canterbury St., Westlake Village, CA (US) 91362

( * ) Notice: Subject to any disclaimer, the term of this patent is extended or adjusted under 35 U.S.C. 154(b) by 0 days.

(21) Appl. No.: 09/426,027

(22) Filed: Oct. 25, 1999

(51) Int. Cl.$^7$ .................................................. B67B 7/14
(52) U.S. Cl. ....................... 220/212.5; 220/694; 81/3.09; 81/3.4; D8/21
(58) Field of Search ................................. 220/212.5, 288, 220/694, 86.2, 752, 755, 757, 759, 768, DIG. 33; 215/228, 295, 302, 303, 305, 329; 81/3.09, 3.4, 176.1, 119, 124.2, 177.5, 177.6, 177.7, 121.1; D8/14, 21, 27; 16/430, 429, 422, 441, 110.1, 411, 425, 426, 427, DIG. 12, DIG. 30; 150/155; 74/551.9

(56) References Cited

U.S. PATENT DOCUMENTS

| | | | |
|---|---|---|---|
| D. 175,721 | * 10/1955 | Glenn | D8/21 |
| D. 364,789 | * 12/1995 | Degyansky | D8/21 |
| D. 374,383 | * 10/1996 | Malak | D8/21 |
| D. 387,255 | * 12/1997 | Rhoton | D8/21 |
| 1,998,649 | * 4/1935 | Arden | 81/3.09 |
| 2,731,056 | * 1/1956 | Anson | 150/155 X |
| 3,048,067 | * 8/1962 | Miles et al. | 81/3.09 X |
| 4,846,025 | * 7/1989 | Keller et al. | 81/3.09 |
| 5,741,003 | * 4/1998 | Segien, Jr. | 16/430 |
| 5,896,785 | * 4/1999 | Shaw et al. | 81/3.09 X |

* cited by examiner

*Primary Examiner*—Nathan J. Newhouse

(57) ABSTRACT

A gas cap contoured cover for use on a motor vehicle gas cap which has a contoured body defining a substantially flat base portion and a rounded portion extending upwardly therefrom. The body has an elongate configuration and includes a pair of lateral portions. A pair of recesses are located on each lateral portion with each of the pair of recesses being at substantially opposite ends of its respective lateral portion.

3 Claims, 2 Drawing Sheets

FUEL CAP CONTOURED COVER

FIELD AND BACKGROUND OF THE INVENTION

This invention relates to fuel cap contoured covers for fuel caps on motor and other vehicles.

Conventionally, motor vehicles include a fuel tank providing a reservoir of fuel for the engine of the vehicle, and the fuel tank attaches to a filling pipe extending from the fuel tank to a convenient location easily accessible on the outside of the vehicle. Often, many vehicles have such a fuel tank filling pipe which terminates at or near the rear fender of the vehicle. The filling pipe terminates, in many vehicles, in a recessed compartment on the outside of the vehicle, the compartment being closed off by a fuel door mounted on a hinge, which can open and close to provide access to the end of the filling pipe. Within the compartment or recess, the filling pipe is closed by a fuel cap to prevent spillage and to also prevent the escape of fuel vapors which are flammable and therefore potentially dangerous.

A typical fuel cap comprises a circular head portion, from which extends a cylindrical threaded member. The cylindrical threaded member engages with corresponding threads within the fuel tank filling pipe at the end thereof so that the fuel cap can be securely tightened. Rubber or other seals or gaskets may be provided to ensure an airtight seal between the fuel cap and the end of the filling pipe.

In conventional fuel caps, the head portion has a somewhat flat upper surface. In order to make it easier for the user to remove and replace the fuel cap, the head portion may include ridges or projections on the outer periphery to facilitate engagement and a firm grip. Alternatively, or in addition, the fuel cap may have on its somewhat flat surface a ridge which can be twisted so as to turn the fuel cap in a clockwise or counter-clockwise direction, as needed.

A problem with many existing fuel caps relates to the difficulty in removing and replacing the fuel cap when refueling the vehicle. A firm connection between the fuel cap and the end of the filling pipe is essential, but this often makes it difficult to remove the fuel cap, especially where the nature of access to the fuel cap may be limited by the size of the compartment or recess. Further, some operators may, due to age or other circumstances, not be strong enough to provide the necessary torque to remove the fuel cap from the end of the filling pipe.

In one aspect, the present invention therefore relates to an accessory which can be attached to existing fuel caps in order to make it easier to remove and/or replace the fuel cap during fueling of the vehicle.

The prior art shows tools and accessories in somewhat related areas. For example, U.S. Pat. No. 4,846,025 (Keller) shows a radiator cap tool for removing radiator caps. The tool has a hollow handle and a flanged hollow face with a recess. Opposed rectangular indentations at the perimeter of the recess facilitate the removal only of a radiator cap.

U.S. Pat. No. 5,699,701 (Cotten) describes a tool for removing a vehicle fuel tank cap. The tool has a cradle for engaging the lug on a conventional fuel tank cap. A handle is pivotally connected as part of the tool, and is pivotable between a stored position and various angular positions to facilitate turning of the fuel cap and to accommodate the strength of a particular user. This tool is claimed to be useful for the elderly and physically handicapped. The tool is, however, somewhat cumbersome, and the fuel door cannot be closed until the tool has been removed.

U.S. Pat. No. 5,896,785 (Shaw) also shows an automobile fuel cap removal tool having a bell shape with channels formed by wall segments on the inside of the bell. A shaft extends from the top of the bell to a handle. However, the handle exceeds the width of the fuel cap and, as with some of the previous prior art mentioned above, the fuel door will not close with the tool in place.

SUMMARY OF THE INVENTION

In one aspect, the present invention is for a fuel cap contoured cover which may be part of the gas cap or is an adaptor or an accessory for a motor vehicle fuel cap which makes it easier for individuals to remove and replace the fuel cap tightly, even where access thereto is somewhat limited, or the operator may find it difficult due to age or weakness to operate the fuel cap.

A particular advantage of one embodiment of the invention is the fact that the fuel cap contoured cover can be relatively permanently, although releasably, fixed to the fuel cap. Thus, the fuel cap contoured cover is able to attach to the fuel cap such that it can remain there permanently, enabling removal and re-attachment thereof, and also enabling the fuel door to be opened and closed without obstruction.

An advantage of the present invention is its ability to attach to an existing fuel cap to facilitate the application of leverage by applying additional torque. The invention provides improved gripping means, and a longer horizontal finger protrusion on the top of the fuel cap to facilitate this greater leverage. Since the invention effectively enlarges slightly and lengthens the finger protrusion already on the fuel cap, in the vast majority of cases, the fuel cap contoured cover of the invention can simply remain on the fuel cap at all times, even during non-fueling and when the fuel door is closed.

The fuel cap contoured cover of the invention may be snapfitted or otherwise attached to the existing fuel cap. In another embodiment, the fuel cap contoured cover can be located on the fuel cap so as to be pivotable or slidable thereon in a direction away from the fuel cap, and return to its closed position when not in use.

According to one aspect of the invention, there is provided a fuel cap contoured cover for use on a motor vehicle fuel cap, the contoured cover comprising: a contoured body defining a substantially flat base portion and a rounded portion extending upwardly therefrom, the body having an elongate configuration and including a pair of lateral portions; and a pair of recesses located on each lateral portion, each of the pair of recesses being at substantially opposite ends of the lateral portion.

DETAILED DESCRIPTION OF THE PREFERRED EMBODIMENTS

Figure 1:
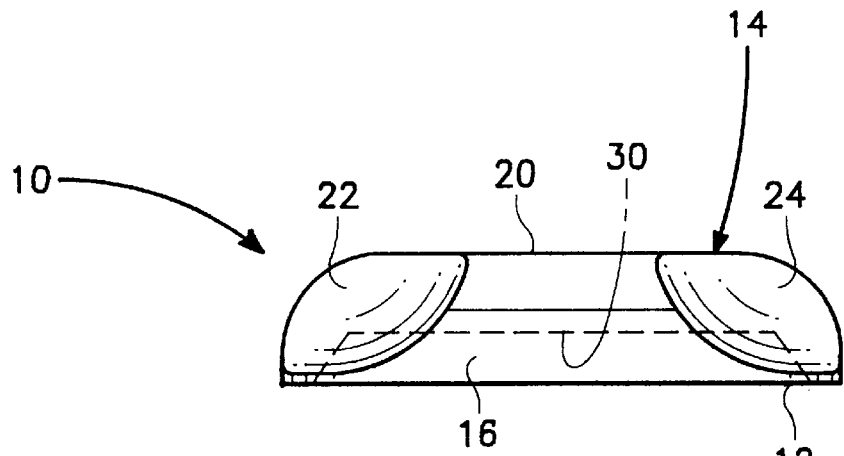
FIG. 1 is a side view of the fuel cap contoured cover of the invention.
Figure 2:
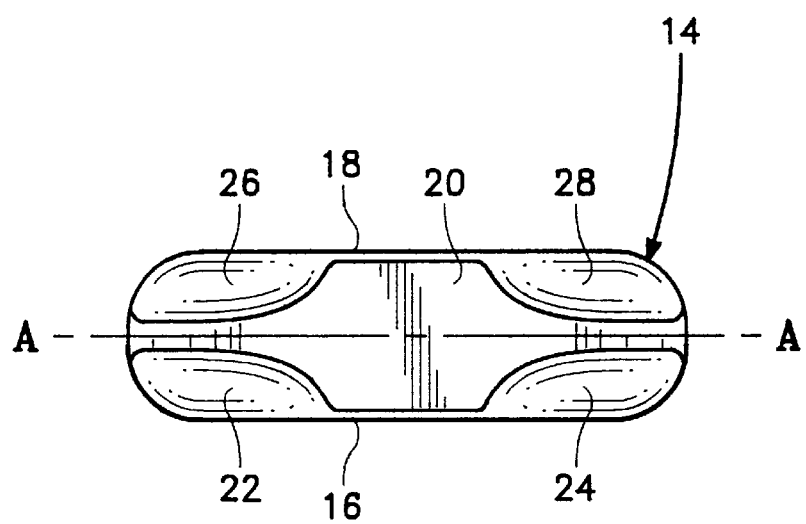
FIG. 2 is a top view of the cover shown in FIG. 1.
Figure 3:
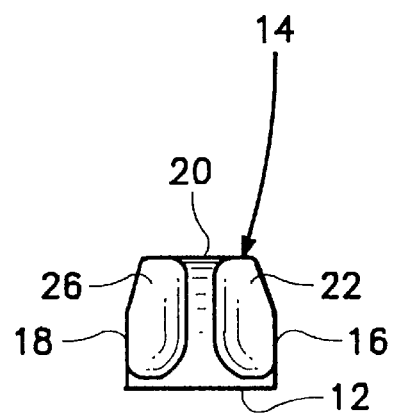
FIG. 3 is a left end view of the cover shown in FIG. 1.

With reference to FIG. 1 of the drawings, there is shown a contoured cover 10. The cover 10 has a flat, substantially horizontal base 12, and a partially rounded body 14 extending upwardly from the base. The body 14 has lateral portions 16 and 18 on each side of the median indicated by line A—A. This means that the lateral portions are abutting each other and facing in opposite directions as is clearly shown in FIG. 2. A flattened top portion 20 connects between the two lateral portions 16 and 18, and provides an area on which written material, such as advertisements, instructions or other graphic representations can be displayed.

On each lateral portion 16 and 18 there is provided a pair of contoured recesses. Recesses 22 and 24 are located on lateral portion 16, and recesses 26 and 28 are located on lateral portion 18. The recesses are configured so as to be rounded and approximately the shape and size of a thumb and finger to accommodate and hold within the recesses the thumb and finger of a user during operation of the contoured cover 10.

It will be noted that the recesses are all located towards the ends of the body 14, and not in the middle thereof. The purpose of this construction is to ensure that the fingers and thumb, when turning the fuel cap contoured cover, are located at the ends thereof so as to ensure the applying of maximum torque and leverage in the opening and closing of the fuel cap.

Figure 4:
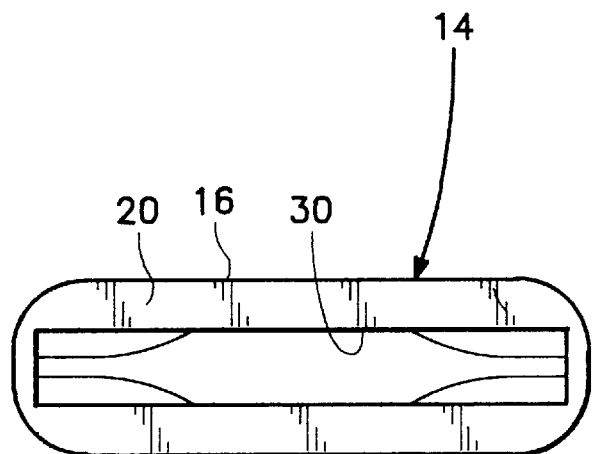
FIG. 4 is an underside view of the cover shown in FIG. 1.
Figure 5:
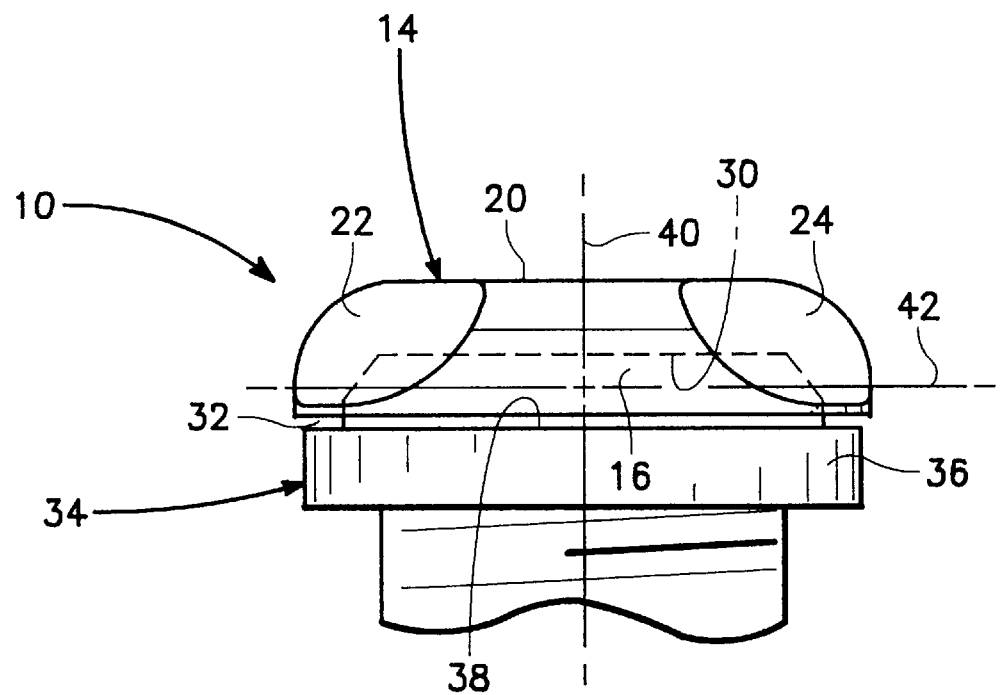
FIG. 5 is a view of the cover superimposed on a fuel cap.

Reference is now made to FIG. 4 of the drawings, showing an underside of the contoured cover shown in FIG. 1. Within the base, there is a rectangular chamber 30 which extends into the body 14 of the cover. The chamber 30 is adapted to receive a handle 32 located on a fuel cap 34, and straddle the handle 32 so as to remain thereon. FIG. 5 of the drawings shows a contoured cover 10 of the invention located over the fuel cap 34, which is shown in phantom lines. The fuel cap 34 has a head portion 36 having an upper flat surface 38 from which the handle 32 extends. The handle 34 is to be snugly located within the chamber 30 of the contoured cover 10. The fuel cap 34 has a longitudinal center axis 40 which is to align with the longitudinal center axis of the fuel filling pipe (not shown). The cover 10 has an elongated dimension 42 which is located perpendicular to the longitudinal center axis 40. The elongated dimension 42 is substantially longer than the transverse dimension of the cover 10 as is clearly shown in FIG. 5.

The present invention works well on fuel caps where the existing handle may be inaccessible, or difficult to turn owing to the fact that the operator may be of limited length. The fuel cap may require more force by the user to remove it and replace it onto the fuel tank filling pipe. Not only does the contoured cover of the invention provide greater leverage by being of larger lateral dimensions, but it also ensures, by the positioning of the recesses thereon, that the user's hand is directed towards the ends of the fuel cap cover so as to take maximum advantage of the leverage provided by the additional size and shape of the contoured cover 10.

The invention is not limited to the details illustrated and described above.

What is claimed is:

1. A fuel cap contoured cover usable to manually apply a turning torque on a motor vehicle cap, said fuel cap having a longitudinal center axis, said contoured cover comprising:

an elongated contoured body defining a base portion and a rounded portion extending upwardly therefrom, said flat base portion to be located against said fuel cap, said elongated body having a longitudinal dimension which is perpendicular to said longitudinal center axis, said body including a pair of lateral portions which abut each other and face in opposite directions, each said lateral portion having ends, said body including an internal chamber; and a pair of recesses located on each said lateral portion, each pair of said recesses being located at said ends of said lateral portion with a single said recess being located at a said end, whereby with a portion of said fuel cap being mounted within said internal chamber a manual torque is appliable to said body by use of said recesses which facilitates turning of said fuel cap, whereby said cover is designed to be permanently installed in conjunction with said fuel cap.

2. The fuel cap contoured cover as defined in claim 1 comprising:

a top portion located at a position substantially opposite to said base portion, said top portion facilitating the display of written material.

3. The fuel cap contoured cover as defined in claim 1 wherein:

said internal chamber being rectangular.

* * * * *